UNITED STATES PATENT OFFICE

2,954,384

METHOD FOR PREPARING KAINIC ACID AND ITS DERIVATIVES, AND INTERMEDIATE THEREOF

Sueo Tatsuoka, Suita, Kuniyoshi Tanaka, Toyonaka, Yoshio Ueno, Takarazuka, and Mikio Honjo, Asahi-ku, Osaka, Japan, assignors to Takedo Pharmaceutical Industries, Ltd., Osaka, Japan No Drawing. Original application Feb. 12, 1957, Ser. No. 639,608, now Patent No. 2,902,492, dated Sept. 1, 1959. Divided and this application Mar. 11, 1958, Ser. No. 723,078

Claims priority, application Japan May 7, 1955

3 Claims. (Cl. 260—326.3)

This invention relates to a method for preparing kainic acid and its derivatives, and to intermediate thereof. This case is a continuation-in-part of copending application by the same inventors having Serial Number 581,848 (filed on May 1, 1956). This application is also a division of application Serial No. 639,608, filed February 12, 1957, and now U.S. Patent Number 2,902,492.

*Digenea simplex* Ag. has been known from ancient times as an anthelmintic against ascaris, but its active ingredient had not been clarified until recently. Shinzo Murakami and Tsunematsu Takemoto have succeeded at last in isolating an active component of this vegetable drug and named it kainic acid (J. Pharm. Soc. Japan, 73, 1055 (1953); ibid., 74, 560 (1954)). And the anthelmintic activity of this substance was also reported in J. Pharm. Soc. Japan, 73, 1026 (1953) and ibid., 75, 1253 (1955).

The present inventors established the structure of the substance as 2-carboxy-3-carboxymethyl-4 isopropenyl-pyrrolidine (J. Pharm. Soc. Japan, 75, 843 (1955)).

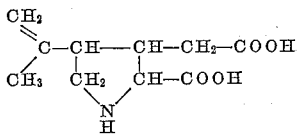

As is evident from the structure, kainic acid has eight isomers. Namely the substituents at 2-, 3- and 4-positions of pyrrolidine nucleus can take the following four racemic forms: trans/cis, cis/cis, trans/trans, cis/trans, and they are signed as α-, β-, α-allo- and β-allo-configurations, respectively. And each of these four racemates has L- and D-forms according to the configuration of the carboxyl radical to the imino radical.

The present inventors found that it is possible to synthesize kainic acid, its ester and N-substituted compounds. Kainic acid acid described hereinafter includes all of the eight isomers.

The present invention is based on the finding that kainic acid or its ester or its N-substituted compound is obtained when the substituent $R^1$ of a compound having the structure without considering the steric configuration

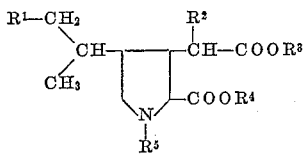

is eliminated together with the α-hydrogen of the β-substituted isopropyl radical to form a double bond.

In the above formula the symbols signify as follows: $R^1$ is hydroxy, alkoxy such methoxy, ethoxy and propoxy, $R^2$ is hydrogen or carbalkoxy radical such as carbomethoxy and carbethoxy, $R^3$ and $R^4$ are same or different radicals representing hydrogen or alkyl such as methyl, ethyl, propyl and butyl, and $R^5$ is hydrogen, acyl such as acetyl, propionyl and benzoyl, or carbalkoxy such as carbomethoxy and carbethoxy.

The above-mentioned starting material is synthesized via the path examplified hereunder.

(i) An ested of N-carbalkoxy-N-[2-(β-alkoxyisopropyl)-2-carbalkoxyethyl]-glycine is treated with metallic alkali to obtain N-carbalkoxy-2-carbalkoxy-4-(β-alkoxyisopropyl)-pyrrolidone-(3), and the product is hydrogenated to the corresponding 3-hydroxy compound. The 3-hydroxy compound is further led to the 3-acetoxy or 3-halogen derivative, which is condensed with malonic ester to give N-carbalkoxy-2-carbalkoxy-3-dicarbalkoxymethyl-4-(β-alkoxyisopropyl)-pyrrolidine. When the 3-carbalkoxymethyl compound is desired, the 3-dicarbalkoxymethyl product is partially hydrolized and then decarboxylated. When N-acyl-N-[2-β-alkoxyisopropyl]-2-carbalkoxyethyl]-glycine is used as material, the product has also acyl as the N-substituent.

(ii) 1-acetyl-5-(2'-alkoxyisopropyl)-2-piperidone-3-ene is condensed with malonic ester to form 4-dicarbalkoxymethyl compound, and the residual hydrogen of malonic ester radical of the product is halogenated. And the halogenated compound is related with alkali to open the piperidone ring between 1- and 2-positions to form 2-carboxy-3-carboxymethyl-4-(2'-alkoxyisopropyl)-pyrrolidine. The product can be esterified and/or N-substituted by conventional processes.

Starting from the materials thus obtained the desired products of the present invention are prepared as follows.

When the substituent $R^1$ is hydroxyl or alkoxy, it is eliminated together with the α-hydrogen of the β-substituted isopropyl radical in the following manner: the material is treated with a halogenating agent to replace the substituent $R^1$ with halogen and the product is subjected to dehydrohalogenation. For example, when the material is treated with hydrohalogenic acid or with phosphorus trihalogenide, the substituent $R^1$ is directly substituted for with halogen when it is hydroxyl, but when $R^1$ is alkoxy, it is first converted into hydroxyl and then into halogen, and finally the halogen is eliminated together with the α-halogen of the β-substituted isopropyl radical in the presence of a dehydrohalogenating agent in order to form isopropenyl radical at 4-position of the pyrrolidine nucleus. As dehydrohalogenating agent, organic alkaline substances such as pyridine, picoline and tertiary amine, or inorganic alkaline substances such as silver carbonate and silver oxide may be conveniently used.

In most cases, the halogenating agent is acidic. Therefore, the above-mentioned halogenation causes the carbalkoxyl radicals in the material to hydrolize into carboxyls. For example, when $R^2$ is a carbalkoxy radical, it is hydrolized to carboxyl and replaced with hydrogen by decarboxylation at a stroke, and at the same time the substituent at the N-position is also removed.

Thus, the starting material is converted into kainic acid or its derivatives.

Similar to kainic acid, the starting material has eight isomers. Each of the isomers may be used as the material, because difference in steric configuration does not affect the method of the present invention. Steric inversion may or may not occur during the reaction.

The product, kainic acid or its derivatives, is separated from the reaction mixture making use of the following characters.

Differences between the product and impurities in solubility in the reaction medium or in various solvents, in distribution coefficient in two solvents, in absorbability in various absorbents, and difference between the heavy

Example 1

A mixture of 14 g. of 1,2-dicarbethoxy-3-dicarbethoxymethyl-4-(β-ethoxyisopropyl)-pyrrolidine and 150 cc. of hydrobromic acid (sp. gr. 1.48) is boiled for 28 hours, and the mixture is evaporated to dryness under reduced pressure. 2.5 g. of the residue is suspended in 30 cc. of methanol and the suspension is saturated with dry hydrogen bromide. After standing for 48 hours the mixture is evaporated to dryness under reduced pressure, the residue is dissolved in 10 cc. of water, and the hydrogen bromide in the solution is eliminated by silver carbonate prepared from 6.8 g. of slver nitrate and 2.2 g. of anhydrous sodium carbonate. The precipitate is filtered and extracted with two 150 cc.-portions of ethyl acetate, and the filtrate is also extracted with 30 cc. of the same solvent. The combined extracts are evaporated and the residue is distilled under reduced pressure to obtain 2-carbomethoxy - 3 - carbomethoxymethyl - 4 - isopropenyl-pyrrolidine as colorless liquid. B.P.$_{0.3}$ 115–118° C.

*Analysis.*—Calcd. for $C_{12}H_{19}O_4N$: C, 59.73, H, 7.94. N, 5.81. Found: C, 59.48. H, 8.38. N, 5.93.

The infrared absorption spectrum of this product corresponds to the above structure. Presence of isopropenyl radical is recognized by decolorization of bromine, brown color reaction with tetranitromethane and formation of formaldehyde by ozone-oxidation. Hydrolysis of the product gives DL-α-allokainic acid.

L-α-allokainic acid can be resolved from the above DL-α-allokainic acid through a convenient method, and its properties. M.P. 237° C. (decomp.), $$[\alpha]_D^{26} = +8° \ (c. = 1\%, H_2O),$$

are in good agreement with those of natural L-α-allokainic acid [M.P. 237° C., $[\alpha]_D^{10} = +8.0°$ ($H_2O$)].

Example 2

2 - carboxy - 3 - carboxymethyl - 4 - (1' - methyl - 2'-hydroxyethyl)-pyrrolidine, M.P. 236° C. (decomp.), is first esterified, then N-carbethoxylated, and 6.6 g. of the resulting compound, 1-carbethoxy-2-carbomethoxy-3-carbomethoxymethyl - 4 - (1' - methyl - 2' - hydroxyethyl)-pyrrolidine (B.P.$_{0.5}$ 200° C.), is dissolved in 13 cc. of chloroform. 0.7 cc. of pyridine is added to the solution and to the mixture is added dropwise with agitation under cooling with ice a solution of 1.8 g. of phosphorous tribromide in 5.4 cc. of chloroform, and the mixture is heated for five hours on a water-bath. After cooling, the reaction mixture is poured into ice-water and extracted with ether. The ethereal solution is washed with sodium bicarbonate solution and water successively, dried with anhydrous sodium sulfate and concentrated. A proper amount of pyridine is added to the residue, and the mixture, after being heated on a water-bath, is diluted with ether, whereupon white precipitates come out. The ethereal solution is washed with diluted hydrochloric acid, sodium bicarbonate solution and water in this order, then dried with anhydrous sodium sulfate and concentrated. The residue is distilled under reduced pressure and the fraction distilling over 160–185° C., 0.15 mm., is redistilled to obtain DL-1-carbethoxy-2-carbomethoxy-3-carbomethoxymethyl - 4 - isopropenylpyrrolidine, B.P.$_{0.15}$ 153° C.

*Analysis.*—Calcd. for $C_{15}H_{23}O_6N$: C, 57.49; H, 7.40; N, 4.47. Found: C, 5702; H, 7.44; N, 4.30.

The infrared spectrum in chloroform of this product is in complete accord with the corresponding compound of natural L-α-kainic acid. And hydrolysis of the product gives DL-α-kainic acid, moreover DL-α-kainic acid thus obtained can be resolved into D- and L-α-kainic acid having the following properties. D-α-kainic acid melts at 243° C. with decomposition and shows white needles. L-α-kainic acid melting at 248° C. with decomposition, $[\alpha]_D^{17} = -15.0°$ (c.=1%, $H_2O$), shows no depression when it is melted with natural L-α-kainic acid having M.P. 250° C. (decomp.), $[\alpha]_D^{20} = -14.8°$ (c.=1%, $H_2O$), and the infrared spectrum of L-α-kainic acid thus obtained is in good accord with the natural L-α-kainic acid.

Example 3

A mixture of 29 g. of 1,2-dicarbethoxy-3-dicarbethoxymethyl-5-(1'-methyl-2'-ethoxyethyl)-pyrrolidine and 500 g. of concentrated hydrobromic acid (d.=1.48) is boiled for 20 hours, then evaporated to dryness under reduced pressure. The residue is dissolved in 200 cc. of methanol and saturated with hydrogen chloride under cooling with ice. After standing over night, the solution is carefully evaporated to dryness at a temperature below 40° C., and the residue is dissolved in 200 cc. of cold water. To the solution is added the same amount of ethyl acetate, and 22.2 g. of sodium bicarbonate and 9.6 g. of ethyl chlorocarbonate are added in small portions to the mixture alternatively. The mixture, after being stirred for about 2 hours, is extracted with ethyl acetate and the extract is washed with diluted hydrochloric acid and water successively, then dried with anhydrous sodium sulfate and the solvent is evaporated. The residue is distilled under reduced pressure to obtain 5.7 g. of a light yellow oily substance, B.P.$_{0.3}$ 146–149° C., and 5.3 g. of a light yellow viscous liquid, B.P.$_{0.4}$ 162–165° C. The former is DL-1-carbethoxy-2-carbomethoxy-3-carbomethoxymethyl-4-isopropenylpyrrolidine and gives DL-α-allokainic acid by hydrolysis.

*Analysis.*—Calcd. for $C_{15}H_{23}O_6N$: C, 57.49; H, 7.40; N, 4.49. Found: C, 57.57; H, 7.34; N, 4.56.

Thus obtained product can be resolved into D- and L-α-allokainic acid. L-α-allokainic acid, M.P. 237° C. (decomp.), $[\alpha]_D^{26} = +8°$ (c.=1%, $H_2O$), shows colorless needles and is recognized to be identical wtih natural L-α-allokainic acd.

The fraction having B.P.$_{0.4}$ 162–165° C. is 1-carbethoxy - 2 - carbomethoxy - 3 - carboxymethyl - 4-hydroxy-4-isopropylpyrrolidine-γ-lactone.

*Analysis.*—Calcd. for $C_{14}H_{21}O_6N$: C, 56.17; H, 7.07; N, 4.68. Found: C, 56.00; H, 7.14; N, 4.67.

What is claimed is:

1. A process for producing a compound having the formula

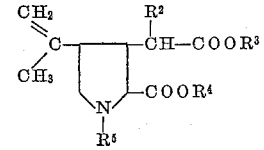

wherein each of $R^2$ and $R^5$ is a member selected from the group consisting of hydrogen and lower carbalkoxy, and each of $R^3$ and $R^4$ is a member selected from the group consisting of hydrogen and lower alkyl, which comprises reacting with a member selected from the group consisting of hydrogen halide and phosphorus halide a compound having the formula

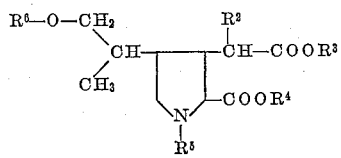

wherein each of $R^2$, $R^3$, $R^4$ and $R^5$ has the aforementioned significances, and $R^6$ is a member selected from the group consisting of hydrogen and lower alkyl, then heating the so-produced compound with a member selected from the group consisting of silver oxide, silver carbonate and pyridine bases.

2. A process for producing DL-α-kainic acid, which comprises reacting 1-carbethoxy-2-carbomethoxy-3-carbomethoxymethyl - 4 - (1' - methyl - 2' - hydroxyethyl)-pyrrolidine with phosphorus tribromide, heating the so-produced product with pyridine, and hydrolyzing the resultant product.

3. A process for producing DL-α-allo-kainic acid, which comprises reacting 1,2 - dicarbethoxy - 3 - dicarbethoxymethyl-4-(1'-methyl-2'-ethoxyethyl)-pyrrolidine with hydrobromic acid, then reacting the so-produced product with silver carbonate, and hydrolyzing the resultant product.

References Cited in the file of this patent

Karrer: Organic Chemistry, Elsevier, pp. 47–48; 63 and 105 (1938).